Sept. 12, 1950        A. E. YOUNG        2,522,011
ATTACHMENT FOR HARROWS
Filed April 9, 1947        2 Sheets-Sheet 2
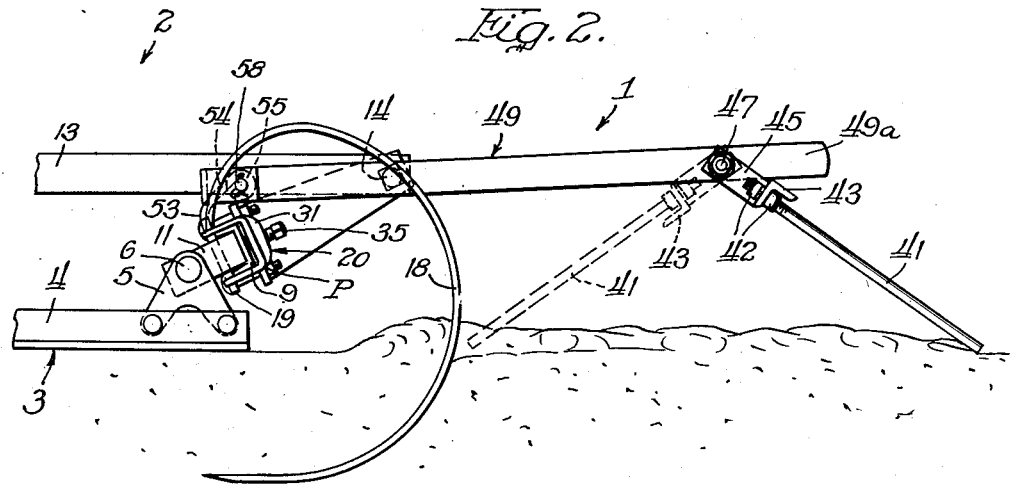
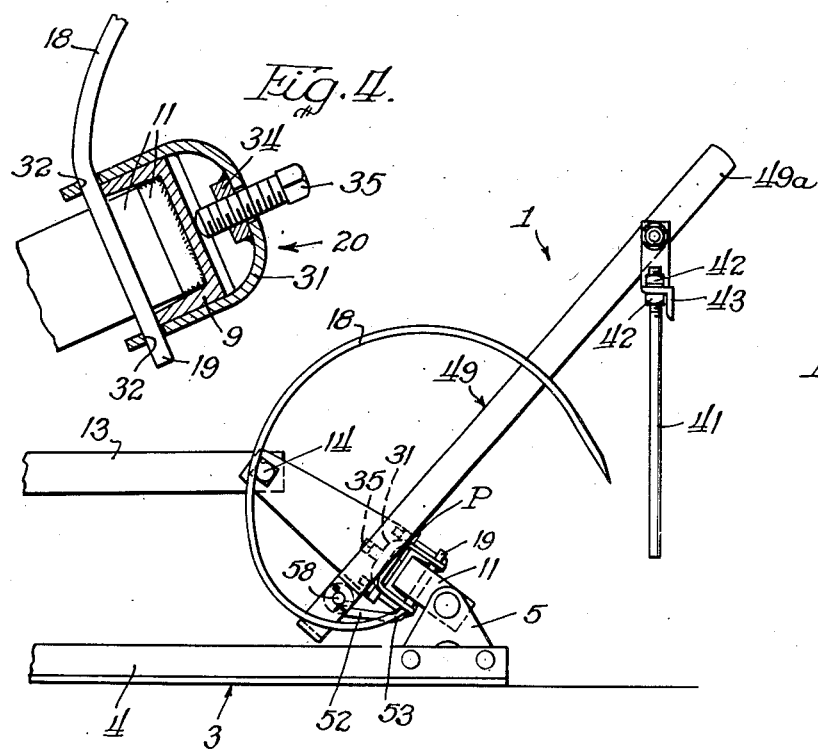
Inventor:
Austin E. Young.

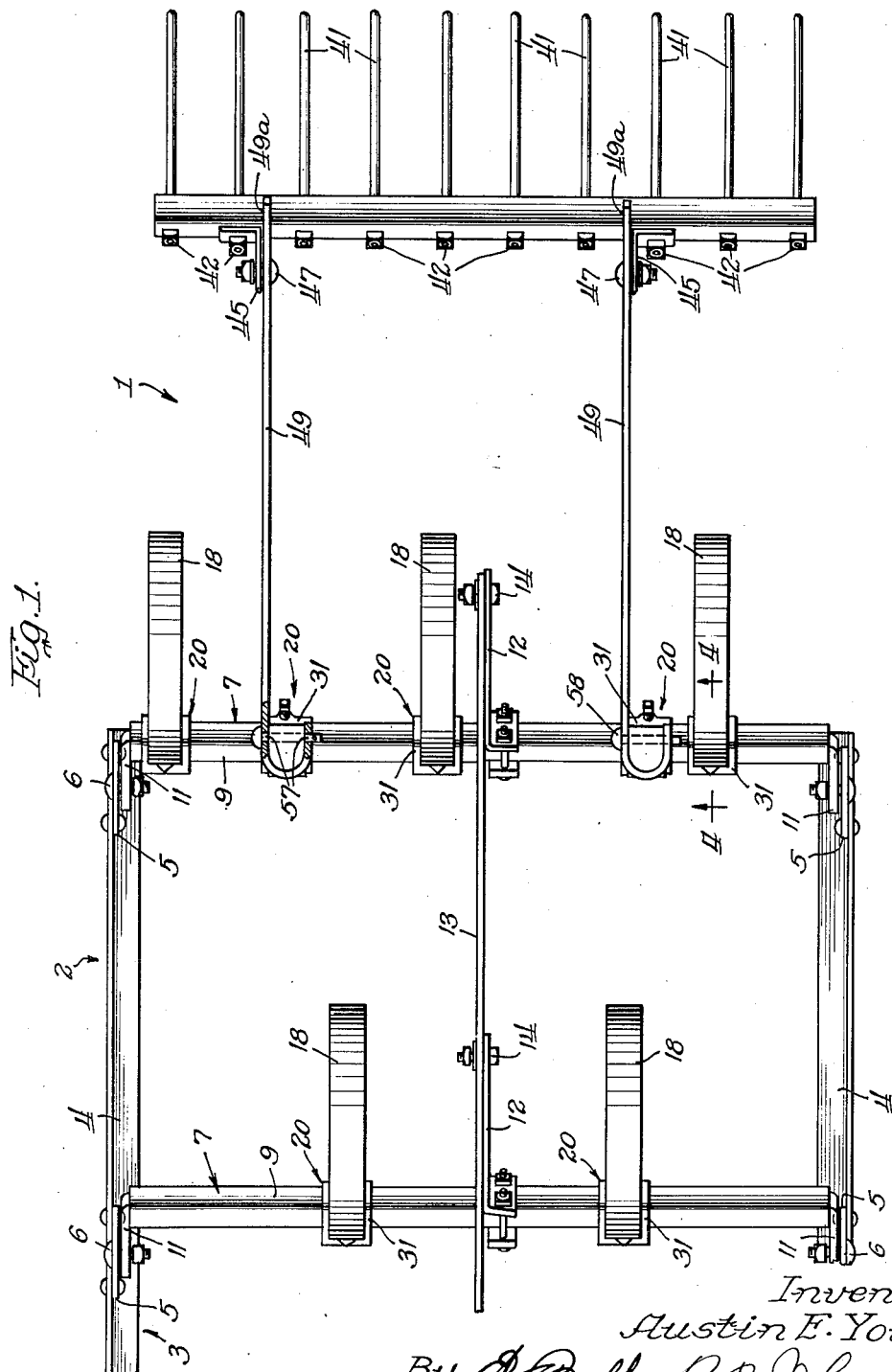

Patented Sept. 12, 1950

2,522,011

UNITED STATES PATENT OFFICE 2,522,011

ATTACHMENT FOR HARROWS

Austin E. Young, Syracuse, N. Y., assignor to Syracuse Chilled Plow Co., Inc., Syracuse, N. Y., a corporation of New York Application April 9, 1947, Serial No. 740,451

6 Claims. (Cl. 55—8)

The present invention relates generally to farm implements of the tractor drawn type and more particularly to ground working tools, such as spring tooth harrows and the like.

The object and general nature of the present invention is the provision of an implement of this type in which means is provided for smoothing out the ridges left by the harrow teeth. More particularly, it is a feature of this invention to provide a harrow of the spring tooth type having a smoothing attachment which smooths the ground rearwardly of the harrow teeth but does not interfere with the backing of the harrow where that is desired or necessary.

Another feature of this invention is the provision of a ground working machine having a smoothing attachment so connected that when the tools or operating units of the implement are raised into a transport position the smoothing attachment is also raised into transport position automatically and without individual attention on the part of the operator. Further, it is a feature of this invention to provide a smoothing attachment for a harrow or the like in which provision is made for backing the harrow without damage to the attachment. This is particularly important where the attachment is used with tractor controlled harrows, such as, for example, a harrow of the type shown in U. S. Patent 2,354,850, issued August 1, 1944, to Curtiss L. Cook and Austin E. Young.

These and other objects and advantages of the present invention will be apparent to those skilled in the art after a consideration of the following detailed description, taken in conjunction with the accompanying drawings, in which:

Figure 1 is a plan view of a smoothing attachment constructed according to the principles of the present invention, showing the same as attached to a spring tooth harrow.

Figure 2 is a side view of the implement shown in Figure 1.

Figure 3 is a view similar to Figure 2, showing the harrow in its transport position and the smoothing attachment in its raised or transport position.

Figure 4 is an enlarged sectional view taken along the line 4—4 of Figure 1.

Referring now more particularly to Figures 1 and 2, the smoothing attachment, which comprises the principal feature of the present invention, is indicated in its entirety by the reference numeral 1 and is shown as attached to a spring tooth harrow shown fragmentarily at 2, the harrow preferably being of the same construction as that shown, by way of example, in the above mentioned Cook et al. Patent 2,354,850, to which reference may be made if necessary. Briefly, the harrow 2 includes a main frame, indicated in its entirety by the reference numeral 3, comprising fore and aft extending runner bars 4 each of which is provided with a plurality of brackets 5 apertured to receive pivots 6 which serve to connect harrow tooth bar structures 7 to the frame bars or runners 4. Each tooth bar structure 7 comprises a transverse channel member 9 each having at its ends angle clips 11 welded or otherwise secured thereto, the outer or lower ends of the angle clips being apertured to receive the pivots 6, which may be in the form of bolts or the like. By virtue of the construction just described, each of the transverse tooth bars 9 is mounted for swinging movement in the frame 3, and the several tooth bars, only two of which are shown in the drawings, are connected to swing together by means of an arm 12 fixed to each tooth bar 9 and one or more connecting links 13 which extend longitudinally and which are pivoted, as at 14, to the outer end of each of the arms 12.

Each of the harrow tooth bars 9 carries a plurality of ground working spring teeth 18 of generally conventional construction, each tooth 18 including a forward end 19 that is connected by a positive lock tooth clamp 20 to the associated tooth bar 9. Preferably, each clamp 20 includes a U-shaped clamping member 31 having apertures 32 to receive the tooth section 19, the apertures being in the side portions of each tooth clamp which embraces the channel bar 9. The central portion of each U-shaped clamping member 31 carries a nut member 34 welded to the clamping member, and a set screw 35 is threaded into the nut member 34 and when tightened bears against the web of the channel 9 and serves to force the end 19 of the spring tooth member 18 up against the edges of the flanges of the tooth bar 9, thereby firmly clamping the tooth 18 rigidly in place.

Turning now to the smoothing attachment 1, which comprises the principal portion of the present invention, in combination with the harrow 2, the smoothing attachment 1 comprises a plurality of smoothing teeth 41 each being threaded at its upper end to receive a pair of lock nuts 42 which firmly and rigidly clamp each tooth to one flange of a transverse bar 43, preferably in the form of an angle. A pair of arms 45, preferably in the form of angle clips, are secured to the tooth bar 43 in any suitable manner, preferably, however, by means of one of the lock nuts 42, and the upper end of each of the arms 45 is apertured to receive a pivot bolt 47. The bar 43 is adapted to be connected to the rear portion of the harrow 2 by a pair of fore and aft extending connecting bars 49. At its rear end, each of the bars is apertured to receive the pivot bolt 47, and each bar 49 includes a rearwardly extending section 49a which overlies the angle bar 43. As best shown in Figures 1 and 2, the length of the arms 45 is such that in operation the teeth 41 swing rearwardly until the angle 43 comes up against the lower edges of the rear sections 49a of the connecting bars 49, thus defining the operating position of the teeth 41.

The front ends of the connecting bars 49 are pivotally connected to the rear tooth bar 9 of the harrow 1. Preferably, this is accomplished by a pair of arms 52 which are clamped to the harrow tooth bar 9 by clamping members 20 which are the same construction as the clamps that secure the spring teeth 18 to the tooth bars 9 of the harrow. Each bracket or arm 52 thus includes a lower section 53 which receives the associated clamp 20 and an upper angled section 54 which is bent, as at 55, to form a pivot receiving section. The forward ends of the connecting bars 49 are turned backwardly so as to provide, in effect, two attaching portions which are apertured, as at 57, to receive a pivot pin 58 that pivotally connects the front end of the associated connecting bar 49 to the associated arm 52. It will be noted from Figure 1 that this type of pivotal connection disposes the main body of each connecting bar 49 to one side of the clamping unit 20, the purpose of which will appear later.

In operation, the parts are arranged as shown in full lines in Figure 2, the harrow 2 and its smoothing attachment being propelled preferably by a farm tractor (not shown), the working portions of the teeth 18 penetrating the ground and loosening the soil, splitting the clods, pulverizing and aerating the ground. Generally, however, the passing of the teeth 18 through the ground tends to leave the soil ridged, and the purpose of the smoothing attachment 1 is to further stir the soil, particularly the upper portions thereof so as to leave the soil level in an excellent condition to receive seed. The smoothing unit 1, being pivoted at points 58 with the rear portion of the harrow 2, smooths the ground by virtue of its own weight, the same being floatingly connected with the harrow 2 and hence operates independently of inequalities in the ground surface that might otherwise raise or lower the smoothing teeth 41 if the same were rigidly attached with the frame of the harrow 2. If it should be desirable to back the outfit at any time, the smoothing unit 41, 43 accommodates this by merely swinging forwardly into the position shown in dotted lines in Figure 2. If, for example, the teeth 41 were not thus pivoted to the connecting bars or other framework, the outfit could not readily be backed since the smoothing teeth would dig into the ground. Generally, the forward and upward swinging of the teeth 41 is limited by virtue of contact of the forward flange of the angle 43 with the lower edges of the connecting bars 49 just forward of the pivots 47.

The smoothing attachment 1 is automatically raised into a transport position whenever the spring teeth 18 of the harrow 2 are raised into their transport position. This may be accomplished as, for example, in the manner set forth in the above identified Cook et al. patent which, as there disclosed in detail, includes means for swinging the tooth bars 9 forwardly by virtue of a forward thrust being imparted to the link or links 13 which acts through the arms 12 to swing the tooth bars 9 in a counterclockwise direction (Figures 2 and 3). Since the arms 52 are disposed in a generally upward direction, which places the pivots 58 in such a position that when the harrow tooth bars 98 are rocked in a counterclockwise direction, as best shown in Figure 2, the points 58 are swung forwardly and downwardly which brings the forward ends of the connecting members 49 down against the rear edges of the caps 31 on the tooth bar 9, contact being established at the points P (Figures 2 and 3), the caps 31 thus serving as parts of the rear tooth bar 9 whereupon further rocking movement thereof acts to swing the connecting bars 49 bodily upwardly and forwardly, raising the smoothing unit 1 into a transport position. As best shown in Figure 2, the unit teeth 41 hang in a generally vertical position, with the angle 43 up against the lower portions of the connecting bars 49 to limit unnecessary swinging of the unit 1 during transport.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. The combination with a harrow including a rockable tooth bar and means for rocking said bar, of a smoothing attachment comprising a toothed unit having forwardly extending bars, and means pivotally connecting the forward portions of said bars to said tooth bar at a point spaced from the axis of rocking movement of said tooth bar, said forwardly extending bars having portions engageable with said tooth bar when the latter is rocked whereby when said tooth bar is rocked said smoothing attachment is swung upwardly.

2. The combination with a harrow including a rockable tooth bar and means for rocking said bar, of a smoothing attachment comprising a toothed unit having forwardly extending connecting members, arms carried by said tooth bar in an upwardly and forwardly extending direction, and means pivotally connecting the forward portions of said connecting members to the upper and forward ends of said arms, so that said connecting members overlie said tooth bar whereby rocking of said tooth bar in a direction to carry said arms generally downwardly acts through said arms to bring the forward portions of said connecting members down into engagement with said tooth bar whereby further rocking of said tooth bar serves to swing said connecting members upwardly and raise said smoothing attachment into an inoperative position.

3. The combination with a harrow including a rockable tooth bar and means for rocking said bar, of a smoothing attachment comprising a toothed unit having forwardly extending bars, generally upwardly extending arms carried by said tooth bar, and means pivotally connecting the forward portions of said bars to the upper ends of said arms whereby as said tooth bar is rocked forwardly to shift the teeth thereof into a transport position said tooth bar contacts said arms and swings the latter upwardly and forwardly and raises said toothed unit into its transport position.

4. In an agricultural implement, a smoothing attachment for a ground working machine or the like having a rockable transverse member, said attachment comprising a plurality of ground engaging teeth, a transverse bar to which said teeth are fixed, a pair of connecting bars pivotally connected at their rear ends to said tooth bar, a pair of arms adapted to be fixed to said rockable transverse member, and means pivotally connecting the forward ends of said connecting bars to said arms in such a position that when said transverse member is rocked, the resulting movement of said arms causes said connecting members to bear against said transverse member and to be rocked bodily therewith, thereby elevating said teeth.

5. In an agricultural implement, a smoothing attachment for a ground working machine or the like having a rockable transverse member, said attachment comprising a toothed ground engaging unit and rigid forwardly extending means, arm means adapted to be fixed to the underside of said rockable transverse member and extending upwardly and forwardly therefrom and means pivotally connecting the forward portion of said rigid connecting means to the upper forward end of said arm means whereby rocking movement of said transverse member, when said arm means is fixed to said transverse member, is adapted to bring said member into contact with said rigid connecting means and acts therethrough to swing said ground engaging unit bodily upwardly.

6. For use with a harrow including a rockable tooth bar and means for rocking said bar, the improvement which includes a smoothing attachment comprising a toothed unit having forwardly extending bars, arm means adapted to be fixed to said tooth bar in rigid relation, and means pivotally connecting the forward portions of said bars to said arm means at points spaced from the axis of rocking movement of said tooth bar, said forwardly extending bars having portions engageable with said tooth bar when the latter is rocked whereby when said tooth bar is rocked said smoothing attachment is swung upwardly.

AUSTIN E. YOUNG.

REFERENCES CITED

The following references are of record in the file of this patent:

UNITED STATES PATENTS

| Number | Name | Date |
|---|---|---|
| 329,606 | Wherry | Nov. 3, 1885 |
| 421,726 | Kern | Feb. 18, 1890 |

FOREIGN PATENTS

| Number | Country | Date |
|---|---|---|
| 80,294 | Sweden | Mar. 1, 1934 |
| 344,179 | Germany | Nov. 15, 1921 |
| 345,412 | Germany | Dec. 9, 1921 |